Patented Feb. 11, 1936

2,030,372

UNITED STATES PATENT OFFICE 2,030,372

PROCESS FOR THE PRODUCTION OF PRACTICALLY IRON-FREE COMPOUNDS OF THE EARTH METALS, ALKALINE EARTH METALS, RARE EARTH METALS, EARTH ACIDS, OR THE LIKE

Gustav Jaeger, Neu-Isenburg, Germany, assignor to Deutsche Gold und Silber Scheideanstalt vormals Roessler, Frankfort-on-the-Main, Germany, a corporation of Germany No Drawing. Application November 5, 1934, Serial No. 751,670. In Germany November 8, 1933

12 Claims. (Cl. 23—22)

This invention has for its object a process for the production of practically iron-free compounds, for example hydroxides, oxides or salts, of the earth metals, rare earth metals, earth acids or the like.

For the manufacture of very highly refractory ceramic utensils or apparatus and also for the production of pure oxides for other purposes, for the production of pure salts and compounds and also of metals, such as aluminium, beryllium and the like, it is necessary to employ a material, which is as free as possible from iron or iron compounds.

According to the process of this invention the iron contained in the raw products is converted into a water-soluble complex ferrocyanide, for example into sodium, potassium or ammonium ferrocyanide and the mixture is treated with alkaline reacting substances. In the treatment of the product with suitable alkalies, for example, caustic alkali, sodium carbonate, or ammonia, the complex ferrocyanide remains in solution or is dissolved, whilst the hydroxides of the earth metals of the like are precipitated.

The process of this invention has been found to be applicable to all these elements, which are precipitated by alkalies, such as caustic soda, caustic potash, ammonia or the like. Examples of elements as aforesaid are the earth metals, such as aluminium, earth acids, such as zirconium, titanium, niobium and tantalum, the rare earth metals or the like. As alkaline reacting substances capable of effecting precipitation all those are suitable which under the prevailing conditions and in the presence of the ferrocyanides do not give rise to the formation of difficultly soluble or insoluble ferrocyanides. For this reason the simultaneous presence of potassium and calcium ions in the solution is avoided.

For the formation of ferrocyanide the iron must be present in a divalent form. In order to convert the iron from the trivalent into the divalent form, use may be made of the usual reducing agents, the conversion being, for example, effected by electrolysis, treatment with sulphurous acid, alkali sulphides or the like. The iron may, for example, be converted with the aid of hydrogen sulphide into ferrous sulphide. The ferro compound is converted into a complex ferrocyanide by the addition of, or by treatment with, alkali cyanide. When employing sulphurous acid or when electrolyzing, the operation is suitably carried out in acid solution. The solution reduced by one of the aforesaid methods, preferably after having been previously neutralized or rendered alkaline, is then caused to interact with alkali cyanide. If necessary, further alkali is added to the reaction mixture.

According to one embodiment of the process of this invention the hydroxides, if necessary after previous reduction of the iron, are caused to precipitate together and are then treated with solutions containing cyanogen and alkali metal ions. This treatment is with advantage carried out in the warm, whereby the ferrous hydroxide goes without difficulty into solution as alkali ferrocyanide. The reduction of the iron present can in this case also be effected subsequently, by ensuring the presence of, for example, sodium sulphide.

According to a particularly advantageous embodiment of the process of this invention the starting material is treated with a mixture, which contains sulphide, cyanide and hydroxyl ions. This is, for example, effected by treating the salt mixture with a solution containing alkali sulphide, alkali cyanide and caustic alkali. The material to be freed from iron can be present in this case both in solution and also in a solid or suspended form. In the former case alkali sulphide and alkali cyanide, preferably a solution of a mixture of both salts, is, for example, allowed to run into the solution of the iron-containing material. If, on the other hand, the iron-containing mixture to be freed from iron is present in a solid or suspended form, it may with advantage be heated in a finely divided condition with suitable quantities of sodium sulphide and sodium cyanide and the resulting products be extracted with water or, if desired, with solutions of alkalies.

An alternative procedure according to this invention is to heat the material to be freed from iron, for example with sulphur or sulphides, preferably alkali sulphides or mixtures of alkalies and sulphur, in a reducing atmosphere, whereby the iron is converted into ferrous sulphide. The resulting product is then extracted with cyanide solution.

A further alternative procedure according to this invention is to pass, for example, hydrogen sulphide into the solution or alkaline suspension containing the iron and the salts of the earth metals and the like, and to convert the iron by the addition of, for example, alkali cyanide into complex ferrocyanide.

The quantities of reagents, such as alkali cyanide, alkalies and reducing agents, required for carrying the process of the invention into effect may vary within wide limits and depend in part on the quality and composition of the starting product. The quantities required can, however, be readily determined by experiments. Since alkali sulphide is formed in the solution during the conversion of ferrous sulphide with alkali cyanide into alkali ferrocyanide, and this alkali sulphide gives rise to the formation of further quantities of iron sulphide, a correspondingly small quantity of alkali sulphide can be added.

The quantities of alkali employed are preferably such that resolution of the precipitated hydroxides does not take place.

An excess of alkali may on occasion give rise to the formation of salts by the interaction of the alkali with the hydroxides, for example to the formation of aluminates or beryllates. In these cases the hydroxides are precipitated, for example by the addition of suitable acids, a procedure which will, however, only be adopted in special exceptional cases owing to the additional costs attended therewith.

*Examples*

1. A solution comprising 36 gms. of caustic soda and 7.8 gms. of $Na_2S.9H_2O$ dissolved in 200 ccs. of water is allowed to run into a solution obtained by dissolving 70 gms. of $BeSO_4.4H_2O$ and 3 gms. of $FeSO_4.7H_2O$ in 100 ccs. of water. The mixture is diluted with an equal volume of water and boiled for 1½ hours. 12 gms. of sodium cyanide are then added, the mixture is boiled with stirring for a further 2 hours and, after allowing to stand, subjected to suctional filtration and the precipitate is thoroughly washed.

After calcining, the resulting beryllium oxide contains 0.03% of $Fe_2O_3$.

2. A solution comprising 36 gms. of NaOH, 8 gms. of $Na_2S.9H_2O$ and 6 gms. of NaCN dissolved in 200 ccs. of water is added to the solution of the sulphates described in Example 1. The mixture is stirred and boiled for 3 hours. The beryllium oxide obtained after suctional filtration, washing and calcining contains 0.012% of $Fe_2O_3$.

3. 85 gms. of calcined, ferric oxide-containing beryllium oxide waste (fragments of ceramic ware and the like) are converted into sulphate by heating with 185 ccs. of concentrated sulphuric acid. After filtering, the resulting solution contains 79 gms. of BeO and 5.29 gms. of $Fe_2O_3$ in 2,500 ccs. This solution is introduced into a solution of 300 gms. of NaOH, 60 gms. of $Na_2S.9H_2O$, and 90 gms. of NaCN in 500 ccs. of water.

The resulting gelatinous mash is stirred and boiled for 3 to 4 hours, the evaporated water being, if necessary, replaced. After standing for some time the mixture is filtered and the precipitate washed. 73 gms. of BeO containing 0.012% of iron are obtained.

4. In a mixture obtained as described in Example 2, the quantity of soda lye was increased until the entire beryllium hydroxide was dissolved in the form of sodium beryllate. After filtering, beryllium hydroxide was precipitated by the careful addition of acids, for example, carbon dioxide. The resulting BeO obtained on calcining contains 0.014% of $Fe_2O_3$.

5. 1000 gms. of $Al_2(SO_4)_3.18H_2O$ and 16 gms. of $FeSO_4.7H_2O$ are dissolved in 2,500 ccs. of water. This solution is allowed to run into a solution of 400 gms. of NaOH, 43 gms. of $Na_2S.9H_2O$ and 64 gms. of NaCN. After boiling and stirring for 2 hours, the initially grey-green precipitate turns almost white. After boiling for a further two hours, the mixture is allowed to settle and is filtered. The $Al_2O_3$ obtained is pure white and contains 0.03% of $Fe_2O_3$.

6. A repetition of Example 5 with 10 gms. of $Na_2S.9H_2O$ and 25 gms. of NaCN yielded an aluminium oxide containing 0.04% of $Fe_2O_3$.

The hydroxides obtained by the process of this invention can be worked up in known manner into compounds of the earth metals or the like by suitable treatment with acids or the like or can be converted by calcining into the corresponding oxides.

The cyanide employed for carrying out the process of this invention and for converting the iron into ferro-cyanide can be practically completely recovered by further working up the ferrocyanides, contained in the liquors separated from the hydroxides, if desired after previous oxidation to ferricyanides, to difficultly soluble cyanogen-containing compounds, for example to Prussian blue, potassium-calcium ferrocyanide or to heavy metal ferrocyanides or the like. The cyanide can then be recovered from these insoluble compounds in known manner in the form of alkali cyanide and be again employed for the process of this invention.

The invention enables iron-containing raw materials to be converted in a simple and cheap manner into practically iron-free hydroxides or compounds or oxides, which could hitherto only be effected in a much more troublesome and costly manner.

What I claim is:

1. A process for the removal of iron from iron-containing raw materials, said process comprising the steps of reducing the valence of the iron, treating with a cyanide, adding water, separating any insoluble matter which may be present at this point, and adding an alkaline reagent to precipitate as hydroxides all cations in the raw material which have the property of forming insoluble hydroxides in the presence of alkaline cyanide, said iron in combination with said cyanide forming a complex water soluble ferrocyanide and removing the insoluble hydroxides.

2. A process for the removal of iron from iron-containing raw materials, said raw materials containing earth metals, said process comprising the steps of reducing the valence of the iron, treating with a cyanide, adding water, separating any insoluble matter which may be present at this point, adding an alkaline reagent to precipitate as hydroxides the earth metals present, said iron in combination with said cyanide forming a complex water soluble ferrocyanide, and removing the insoluble hydroxides.

3. A process for the removal of iron from iron-containing raw materials, said raw materials containing earth acids, said process comprising the steps of reducing the valence of the iron, treating with a cyanide, adding water, separating any insoluble matter which may be present at this point, adding an alkaline reagent to precipitate as hydroxides the earth acids present, said iron in combination with said cyanide forming a complex water soluble ferrocyanide, and removing the insoluble hydroxides.

4. A process for the removal of iron from iron-containing raw materials, said raw materials containing rare earths, said process comprising the steps of reducing the valence of the iron, treating with a cyanide, adding water, separating any insoluble matter which may be present at this point, adding an alkaline reagent to precipitate as hydroxides the rare earths present, said iron in combination with said cyanide forming a complex water soluble ferrocyanide, and removing the insoluble hydroxides.

5. A process for the removal of iron from iron-containing raw materials, said process comprising the steps of reducing the valence of the iron, said reduction taking place as a result of electrolysis carried out in acid solution, subsequently treating with a cyanide, separating any insoluble matter which may be present at this point, adding an alkaline reagent to precipitate as hydroxides all cations which have the property of forming insoluble hydroxides in the presence of alkaline cyanide, said iron in combination with said cyanide forming a complex water soluble ferrocyanide, and removing the insoluble hydroxides.

6. A process for the removal of iron from iron-containing raw materials, said process comprising the steps of reducing the valence of the iron, said reduction being caused by the action of sulphurous acid in an acid solution, treating with a cyanide, separating any insoluble matter which may be present at this point, adding an alkaline reagent to precipitate as hydroxides all cations which have the property of forming insoluble hydroxides in the presence of alkaline cyanide, said iron in combination with said cyanide forming a complex water soluble ferrocyanide, and removing the insoluble hydroxides.

7. A process for the removal of iron from iron-containing raw materials, said process comprising the steps of reducing the valence of the iron, said reduction taking place as the result of the action of an alkali sulfide, treating with a cyanide, adding water, separating any insoluble matter which may be present at this point, adding an alkaline reagent to precipitate as hydroxides all cations which have the property of forming insoluble hydroxides in the presence of alkaline cyanide, said iron in combination with said cyanide forming a complex water soluble ferrocyanide, and removing the insoluble hydroxides.

8. In a process according to claim 1, said reduction of the trivalent iron being effected by dry heating with reducing agents.

9. In a process according to claim 1, said treatment with cyanide taking place after the hydroxides have been formed.

10. A process for the removal of iron from iron-containing raw materials, said process comprising the steps of reducing the valence of the iron, treating with a cyanide, adding water, separating any insoluble matter which may be present at this point, adding an excess of alkali in order to redissolve any precipitate formed, adding an acid to bring the hydrogen ion concentration back to the point at which hydroxides of all cations present which have the property of forming insoluble hydroxides in the presence of alkaline cyanide precipitate, said iron in combination with said cyanide forming a complex water soluble ferrocyanide, and removing the insoluble hydroxides.

11. A process for the removal of iron from iron-containing raw materials, said process comprising the steps of reducing the valence of the iron, treating with a cyanide, adding water, separating any insoluble matter which may be present at this point, and adding an alkaline reagent to precipitate as hydroxides all cations in the raw material which have the property of forming insoluble hydroxides in the presence of alkaline cyanide, said iron in combination with said cyanide forming a complex water soluble ferrocyanide and removing the insoluble hydroxides, oxidizing the liquor containing the ferrocyanide, precipitating the complex cyanide, recovering the alkali-cyanide, and reusing the recovered alkali cyanide in the process.

12. A process according to claim 1, wherein reduction, conversion into ferrocyanide and precipitation of the hydroxides are effected in a single stage of the process.

GUSTAV JAEGER.